(12) United States Patent
Tuason et al.

(10) Patent No.: US 6,391,368 B1
(45) Date of Patent: May 21, 2002

(54) RAPIDLY PEPTIZABLE MICROCRYSTALLINE CELLULOSE-BASED STABILIZING AGENTS

(75) Inventors: Domingo C. Tuason, Bensalem; Edward Selinger, Langhorne, both of PA (US); Gregory R. Krawczyk, Princeton Junction, NJ (US); Christopher Sewall, Hope, ME (US); Daniel T. Hogan, Yardley, PA (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 09/398,627

(22) Filed: Sep. 17, 1999

Related U.S. Application Data

(60) Provisional application No. 60/135,600, filed on May 24, 1999, and provisional application No. 60/101,691, filed on Sep. 25, 1998.

(51) Int. Cl.$^7$ ................................................ A23L 1/03
(52) U.S. Cl. ..................... 426/578; 426/658; 127/32
(58) Field of Search ........................... 426/658, 804, 426/573, 578; 127/32

(56) References Cited

U.S. PATENT DOCUMENTS

| | | |
|---|---|---|
| 3,251,824 A | 5/1966 | Battista |
| 3,539,365 A | 11/1970 | Durand et al. |
| 3,573,058 A | 3/1971 | Tiemstra |
| 4,263,334 A | 4/1981 | McGinley |
| 4,311,717 A | 1/1982 | McGinley |
| 4,980,193 A | 12/1990 | Tuason, Jr. et al. |
| 5,011,701 A | 4/1991 | Baer et al. |
| 5,192,569 A | 3/1993 | McGinley et al. |
| 5,209,942 A | 5/1993 | Bauer et al. |
| 5,366,742 A | 11/1994 | Tuason, Jr. et al. |
| 5,429,830 A | 7/1995 | Janovsky et al. |
| 5,624,612 A | 4/1997 | Sewall et al. |
| 6,270,830 B1 | 8/2001 | Kamada et al. ............. 426/646 |

FOREIGN PATENT DOCUMENTS

WO    WO98/17126    *  4/1998

OTHER PUBLICATIONS

Fenema, "Food Chemistry", third edition, pp. 211–214, 1996.*

* cited by examiner

Primary Examiner—Nina Bhat
(74) Attorney, Agent, or Firm—FMC Corporation

(57) ABSTRACT

The present invention describes the use and preparation of a novel rapidly peptizable stabilizing composition comprising attrited colloidal microcrystalline cellulose wetcake coprocessed and dried with iota-carrageenan, and its use for stabilizing aqueous foods.

14 Claims, No Drawings

RAPIDLY PEPTIZABLE MICROCRYSTALLINE CELLULOSE-BASED STABILIZING AGENTS

This is invention claims the benefit of U.S. Provisional Patent Applications Nos. 60/101,691, filed Sep. 25, 1998 and 60/135,600, filed May 24, 1999.

This invention relates to rapidly peptizable stabilizing agents comprising microcrystalline cellulose and iota carrageenan. More particularly it relates to stabilizing agents comprising these two components which may be readily peptized in aqueous systems in the presence of other ingredients using minimal agitation.

BACKGROUND OF THE INVENTION

Attempts have been made in the past to develop improved microcrystalline cellulose-based stabilizing agents for use in dry mix applications such as instant cocoa milk drinks and low fat or fat-free sauces and gravies. These stabilizing agents may perform one or more desired functions depending on the structure of the agent and on its application. Such functions may include gelling, thickening, suspending, texturizing and/or improving mouthfeel. A requirement of these stabilizing agents is that they can be dispersed with minimal agitation, for example, by being stirred in an aqueous environment with a spoon or a wire whisk. As the dry stabilizing agent is dispersed in water, it must also be peptized to obtain functionality. Peptization means that the dry agent is dispersed in water in a colloidal state. Peptization of a dry agent in aqueous media allows the functionality of the agent to be restored to a level near or at the level observed before the agent was dried. Rapidly-peptized drying agents can be dispersed in a colloidal state with minimal agitation. There is a continuing need for rapidly peptized stabilizing agents that provide desired functionality at low use levels in a variety of food and other applications.

In order to prevent hydrogen bonding, Durand et. al. in U.S. Pat. No 3,539,365 suggest coating the attrited microcrystals with a barrier material. Several materials are mentioned for this purpose, but the most effective is stated to be sodium carboxymethylcellulose (CMC). The patent states (at column 5) that methylcellulose, hydroxypropyl methylcellulose, guar gum, alginates, sugars, surfactants, and other hydrocolloids may have a slight barrier action when added in appreciably higher proportions than CMC. Although the use of CMC is very successful as a barrier coating, it is not universally accepted as a food ingredient because it is a chemically modified cellulose derivative rather than a natural ingredient.

Recognizing the unacceptability of CMC in food ingredients in certain well-populated countries, McGinley in U.S. Pat. No. 4,263,334 avoids the use of CMC by teaching a combination of additives consisting of a first ingredient which is a carbohydrate sweetener, e.g., sucrose, dextrose, or hydrolyzed cereal solids, and a second ingredient which is a hydrocolloid, e.g., guar gum, locust bean gum, gum arabic, sodium alginate, propylene glycol alginate, carrageenan, gum karaya, or xanthan gum. There is no teaching of ready dispersibility for this combination which is used as a component of frozen dairy products, e.g., ice cream, to impart desirable organoleptic characteristics to the food.

In an attempt to prepare an easily dispersible stabilizing agent for dry mix food products, in U.S. Pat. No. 4,311,717 McGinley discloses a stabilizing agent which consists of a spray-dried combination of MCC, CMC, and whey or milk solids. Provided this composition is dry blended with certain other food ingredients, it may be dispersed and peptized with minimal agitation. However, when used in a hot drink, the stabilizer tends to float and become lumpy when stirring is initiated. Furthermore, to obtain functionality similar to other colloidal products, it is necessary to use high levels of the material of this invention because more than 50%, often as much as 75%, of the combination is comprised of CMC and whey or milk solids. The presence of CMC precludes the characterization of this stabilizing agent as being "all natural".

An improved stabilizing agent comprising MCC coprocessed with CMC, starch, preferably having a low amylose content, and a diluent, maltodextrin, whey, or non-fat dry milk solids, preferably maltodextrin, is disclosed by Tuason et al. in U.S. Pat. No. 4,980,193. This three-component powder when dry blended with whey and cocoa powder disperses with instant peptization to form a stable cocoa suspension. Stable cocoa suspensions described in the patent required 2.0–3.3% of the stabilizing agent. Like the product of U.S. Pat, No, 4,311,717, the claim of being "all natural" cannot be made for this material. Furthermore, manufacture of this three-component stabilizing agent is complex and requires special procedures.

Another MCC-based stabilizing agent is described by Tuason et al. in U.S. Pat. No. 5,366,742. This agent is prepared by mixing colloidal MCC with sodium alginate in water and then adding a soluble calcium salt to the slurry in an amount which deposits a sodium, calcium alginate complex on the surface of the MCC to provide barrier coating properties. After homogenization, the slurry is spray dried. The resulting stabilizing agent may be redispersed in water by use of high shear methods which appear to break the calcium alginate crosslinks, thus allowing dispersion to occur. However, in order to disperse this stabilizing agent using minimal agitation, it is necessary to provide a calcium sequestrant to preferentially react with the calcium in the sodium, calcium complex, thereby solubilizing the alginate.

Few, if any, natural hydrocolloids when coprocessed with MCC provide effective barrier coating properties to the spray-dried powder that is produced. In U.S. Pat. No. 5,192,569 McGinley et al. describe the coprocessing of MCC and a galactomannan gum, e.g., locust bean or guar gum. Prior to spray drying, the MCC is attrited and is, therefore, colloidal. However, the product is claimed to be comprised of spherical particles ranging in size from 0.1 to 100 microns. In Example 1 for instance, spray dried powder has a particle size range of 5–70 microns. Dispersion of this coprocessed material requires high shear conditions. In compositions having 15 weight % or more of the galactomannan gum, high shear dispersion of the spray-dried material results in fibrous particles. Both the dispersed spray-dried granules and the fibrous material are described as being particularly effective in providing fat-like properties to food stuffs.

In contrast to the above materials, the compositions of this invention in which attrited MCC and iota carrageenan are coprocessed in ratios of 80:20 to 50:50, respectively, are readily dispersed and peptized with minimal agitation, e.g., stirring with a spoon or a wire whisk, when they are incorporated in dry mixes. Further, they are capable of stabilization of drinks or salad dressings prepared from these mixes at reduced levels of stabilizer. In addition, since there is no CMC present in these compositions, they may be claimed to be "all natural", and are therefore acceptable in countries where CMC is not acceptable.

SUMMARY OF THE INVENTION

It has been found that attrited microcrystalline cellulose and iota carrageenan can be coprocessed at ratios between 80:20 and 50:50, respectively, in an aqueous slurry at or above the temperature at which the iota carrageenan is soluble in water. Spray drying this slurry, for example, produces a dry powder which in a dry mix disperses and peptizes in water with minimal agitation, stabilizing the aqueous drink or sauce prepared from the dry mix. Hereafter in this specification, the word 'carrageenan' is to be construed as meaning iota carrageenan unless a different meaning is clearly indicated. In a second aspect of this invention the stabilizer can be used at significantly lower levels than prior art compositions, including MCC/CMC compositions, to provide stabilization of aqueous foods. Not only is this dispersion and stabilization effective at approximately neutral pH, but it also is effective at strongly acidic pH values, e.g., in vinegar. In addition, it is effective in solutions containing as much as 24 weight percent salt without the requirement for a protective colloid, e.g., xanthan gum, to be present.

In another aspect of this invention there is provided a process to prepare the coprocessed compositions of this invention by first attriting hydrolyzed cellulose wetcake, dispersing the attrited wetcake in water heated to above the temperature at which the particular grade of iota carrageenan being used dissolves, adding the dry carrageenan to the dispersion of microcrystalline cellulose, mixing the components, homogenizing the mixture to assure intimate mixing, and drying the dispersion.

Although not intending to be bound to any particular explanation of the functionality of the compositions of this invention, it has been clearly shown in experiments that the carrageenan provides significant functionality to the composition. Unlike galactomannan gum coprocessed with MCC described in U.S. Pat. No 5,192,569, which does not provide any barrier coating properties at levels up to 30 weight % galactomannan gum, carrageenan provides barrier coating properties at levels as low as 20 weight % of the composition. A second contribution derives its functionality from the close association of the MCC and the carrageenan. In the absence of other viscosifiers, the viscosity of dispersions of this composition is temperature dependent, increasing viscosity occurring as the food cools to an acceptable temperature for ingestion. For example, a gravy prepared with an MCC/carrageenan stabilizer increases in viscosity as it cools, and it may be reheated without modification to provide a smooth gravy having the same viscosity as it had during cooling. In contrast, a starch-based gravy gels as it cools and requires the addition of some starch and water to restore its texture and viscosity upon reheating. This improvement is believed to be attributable to the MCC component of the MCC/carrageenan stabilizer.

DETAILED DESCRIPTION OF THE INVENTION

The microcrystalline cellulose employed in preparing the compositions of this invention is hydrolyzed cellulose wetcake which has been attrited to provide colloidal particles of MCC. For purposes of this invention colloidal is intended to mean having a particle size in the range of 0.1 $\mu$m to 10 $\mu$m in which at least 60% of the particles have a particle size of 0.2 $\mu$m or less. It is necessary for this attrition step to be done in the absence of iota carrageenan because this type of carrageenan interferes with the attrition by reducing the abrasion between cellulose particles required to release the cellulose crystallites.

Iota carrageenan, a polysaccharide which is comprised of repeating galactose units and 3,6-anhydrogalactose units is suitable for the compositions of this invention. A rich source of iota carrageenan is the seaweed *Euchema spinosum*. The approximate content of anhydrogalactose units in iota carrageenan is 30% whereas kappa carrageenan has 34% anhydrogalactose units and lambda carrageenan is essentially devoid of these units. Carrageenans are also characterized by the amount of ester sulfate groups that are present on both the galactose and anhydrogalactose units. The ester sulfate content of iota carrageenan may range from about 25% to 34%, preferably about 32%, which is intermediate between kappa carrageenan which has a 25% and lambda carrageenan which has a 35% ester sulfate content. The sodium salt of iota carrageenan is soluble in water, but different grades of iota carrageenan require heating the water to different temperatures to dissolve them. The iota carrageenans which are suitable for this invention are soluble in water heated up to 80° C. (176° F.). Preferred grades of iota carrageenans are soluble at lower temperatures, for example, at 50° C. (122° F.).

The useful ratios of attrited MCC to iota carrageenan range from about 80:20 to 50:50, respectively. To have adequate carrageenan present for barrier coating properties, the minimum level of carrageenan must be at least about 20 weight %. A preferred. composition, about 70 weight % MCC and 30 weight % iota carrageenan, is suitable for general purpose use in a wide variety of applications. However, the 50:50 composition has properties which make it particularly suitable for use in milk-based applications, especially when some gelling is desirable.

The process to prepare the compositions of this invention begins with the attrition of hydrolyzed cellulose wetcake. As described above, the hydrolyzed cellulose wetcake is usually produced by the acid hydrolysis of wood pulp to partially depolymerize the cellulose, cleaving the cellulose chains in the amorphous regions, but leaving crystalline portions, called crystallites, hydrogen bonded to each other. The attrition is a mechanical step in which the partially depolymerized cellulose is placed under high shear in a variety of environments, e.g., Waring blenders, ball mills, planetary mixers, or other appropriate mechanical means. During the attrition process, the cellulose particles rub against each other, and the ensuing friction causes the individual crystallites to be separated or "peeled" from the fiber or fragment, freeing the crystallites. After attrition, the colloidal cellulose is dispersed in an appropriate amount of water that has been heated to a temperature at or above the dissolution temperature of the iota carrageenan with which it is to be coprocessed. For example, a satisfactory temperature of the cellulose dispersion would be approximately 57° C. when an iota carrageenan having an aqueous dissolution temperature of 50° C. is being used. The dry carrageenan is then added to the cellulose dispersion with agitation to dissolve the carrageenan. After the carrageenan has been completely dissolved, the dispersion is homogenized to assure intimate mixing of the MCC and carrageenan. The homogenized dispersion is then dried in a manner which produces a readily reconstitutable powder.

The method of drying, i.e., removing the water from the dispersion, may be any method which ultimately produces a reconstitutable powder. One such method is spray drying, a method which is frequently used to produce microcrystalline cellulose and microcrystalline cellulose coprocessed with, for example, carboxymethylcellulose or galactomannans. An alternative to spray drying involves the following steps. First, one or two volumes of alcohol, e.g., 75% aqueous isopropanol, is added to each volume of dispersion. This causes the solids in the dispersion to flocculate. These solids may be filtered, dried, and milled to a powder having the same properties as spray-dried powder.

When incorporated into dry food mixes, e.g., instant cocoa drinks, instant soups, gravies, salad dressings, puddings and the like, the stabilizing agents of this invention may easily be dispersed and peptized by simply stirring the mix in water with a spoon or a wire whisk. These stabilizing agents have a unique combination of properties, including low pH stability, milk gelling properties, stability in high concentrations of salt, and freeze/thaw stability in frozen desserts. These are properties not previously provided by a single microcrystalline cellulose-based stabilizing agent. For example, the materials described in U.S. Pat. No. 5,366,742 (Avicel® AC) have ready dispersibility provided there is a sequestrant present to counteract the effect of the calcium ions. Also these MCC/alginate materials have pH stability above a pH of 3.5; however, below this pH alginic acid is precipitated, causing destabilization.

The level of stabilizing agent in a food may range from about 0.05 weight % to about about 3 weight %, depending on the particular food being stabilized and the ratio of MCC to iota carrageenan in the stabilizing agent being used. A preferred range is from about 0.05 to about 2 weight %. In addition to being able to be used alone in environments in which other stabilizing agents are currently being used, often in combination with other stabilizers such as xanthan gum and starches, the levels of the stabilizing agents of this invention are lower than the levels required for these other stabilizers. In most applications the need for an additional stabilizer is thus avoided by the use of the stabilizers of this invention. For example, in salad dressings, a 2% level of MCC/carrageenan stabilizer can successfully replace 2.5% of an MCC/CMC product (Avicel® CL-611) which requires 0.4% of xanthan gum to be present as a protective colloid in the acidic and salty environment. In addition to the simplification of using a single stabilizing agent in the salad dressing, there is a manufacturing improvement as well. By using the MCC/carrageenan stabilizing agent, there will no longer be a requirement that equipment be cleaned to remove traces of acid in the system that interfere with the dispersion of an MCC/CMC stabilizer in the next batch of salad dressing.

In a sauce formulation, 2% of the 70:30 MCC/carrageenan stabilizer has been shown to replace 4% of a modified starch, while providing a creamier texture and increased opacity. This sauce also flows more smoothly than the comparative sauce containing 4% of the modified starch. The thickening of this sauce with the MCC/carrageenan occurs as the sauce cools, but, unlike the sauce containing the starch, it maintains its texture and viscosity when the sauce is reheated.

In dry mixes, for example, an instant cocoa mix, only 0.3 weight % of the MCC/carrageenan agent is required to stabilize the suspension of cocoa particles whereas Avicel® AC is required to be present in 1 weight % for equal stabilization of the cocoa particles.

Dry mixes are comprised of dry components which are dry blended, and at some later time the dry mix is reconstituted in water. The MCC/carrageenan stabilizing agents of this invention in dry mixes are readily reconstituted with minimal agitation (spoon stirring or wire whisk), provided they are mixed with the other components prior to dispersion. This is to be contrasted with wet food systems in which mixing with a greater amount of shear is almost universally used in an aqueous environment. For example, preparation of a salad dressing, a wet food system, comprises dispersing the components of the dressing in water using a Lightnin' mixer or its equivalent.

In wet foods comprising a significant salt content, dispersion with a Lightnin' mixer does not require any external heat, provided that the salt is added after the dispersion is prepared. This subsequent addition of salt does not affect the stability of the dispersion. An exception is the dispersion of MCC/carrageenan stabilizers in extremely salty solutions where significant heating is required to disperse them in, for example, soy sauce which contains approximately 24 weight percent salt. Also, in some applications, particularly those involving dispersions in milk, it may be necessary to apply some heat to the mixture to assist in the dispersion. This ready dispersibility is in contrast to the MCC/CMC stabilizing agents, e.g., Avicel® RC-581, which require high shear dispersion and are sensitive to added salt or acidic conditions.

As previously mentioned, the MCC/iota carrageenan stabilizing agents may be used in rapidly dispersing dry mixes, including instant sauces, gravies, soups, and instant cocoa drinks. They also may be used in such wet food systems as low pH dairy systems including sour cream, yogurt, yogurt drinks, frozen yogurt; baked goods, including pie and pastry fillings; citrus-flavored beverages; salad dressings; and soft-serve and hard pack ice creams with improved creaminess and texture. Other possible uses include cosmetic creams, lotions, toothpaste, paints, polishing agents, and pharmaceutical and pesticide formulations as a suspending aid.

The following examples are intended to be illustrative of the preparation and use of the MCC/carrageenan stabilizing agents, but are not to be construed as limiting their utility.

EXAMPLE 1

In a large beaker containing 2529.9 grams of deionized water heated to 57° C., 389.8 grams of colloidal, i.e., attrited, microcrystalline cellulose wetcake (56.9% water content) was dispersed with a Lightnin' mixer fitted with a propeller stirrer. After dispersion was complete, 80.3 grams of iota carrageenan (100% soluble at 50° C., water content 10.3%) was added to the dispersion. Upon complete dissolution of the carrageenan, the dispersion was homogenized using an APV Gaulin homogenizer in a single pass at 17,236.9 kPa (2500 psi). After homogenization the dispersion had a viscosity of 5500 cps (Brookfield RVF viscometer, spindle #6, 20 rpm). This dispersion was spray dried using a 0.91 meter Bowen spray drier at inlet and outlet temperatures of 200° C. and 100° C., respectively, producing a white powder having a ratio of MCC:carrageenan of 70:30.

To test the peptizability of the MCC/carrageenan powder produced, a dry mix comprising 20.4 grams of sucrose, 76.8 grams of non-fat dry milk solids, 2.8 grams of cocoa (DeZaan), and 0.3 gram of MCC/carrageenan powder was prepared. This dry mix was added to 100 grams of hot distilled water and stirred with a spoon, preparing a stable suspension of the cocoa. A suspension of a dry mix having the same proportion of ingredients requires 1 gram of Avicel® AC to provide comparable stability.

A second test of the peptizability of the MCC/carrageenan powder involved the preparation of a model sauce comprising 10 grams of sodium chloride and 10 grams of MCC/carrageenan powder in 480 grams of deionized water. This mixture was easily dispersed cold with a wire whisk and was then heated to 82.2° C. (180° F.) with stirring. Heating was discontinued, and the viscosity was measured at five minute intervals as it cooled. The viscosity initially was low, but increased significantly at lower temperatures. A comparative model sauce formulation comprising 20 grams starch (Firmtex®), 5 grams of sodium chloride, and 475 grams of deionized water was prepared in a similar manner. The viscosities of the model sauces are shown in Table 1.

TABLE 1

| Time | Temperature | Viscosity (cps) | |
|---|---|---|---|
| (minutes) | (° C.) | MCC/cgn | Starch |
| 0 | 76.7 | 87.5 | 1500 |
| 5 | 60 | 100 | 1850 |
| 10 | 57.2 | 2150 | 2075 |
| 15 | 51.7 | 4000 | 2325 |

EXAMPLE 2

By the method of Example 1 551.7 grams of colloidal microcrystalline cellulose wetcake was dispersed in 2384.9 grams deionized water, and 63.4 grams of iota carrageenan (5.3% water content) was added to the resulting dispersion. After homogenization, the viscosity of the dispersion was 8500 cps (Brookfield RVF, Spindle #6, 20 rpm. The spray-dried powder that was produced had a ratio of MCC:carrageenan of 80:20.

EXAMPLE 3

By the method of Example 1 206.9 grams of colloidal microcrystalline cellulose wetcake was dispersed in 2698.1 grams of deionized water, and 95.0 grams of iota carrageenan (10% water content) was added to the resulting dispersion. After homogenization, the viscosity of the dispersion was 3000 cps (Brookfield RVF, spindle #6, 20 rpm). The spray-dried powder that was produced had a ratio of MCC:carrageenan of 50:50.

EXAMPLE 4

In a large beaker containing 2529.9 grams of deionized water heated to 57° C., 389.8 grams of colloidal, i.e., attrited, microcrystalline cellulose wetcake (56.9% water content) was dispersed with a Lightnin' mixer fitted with a propeller stirrer. After dispersion was complete, 80.3 grams of iota carrageenan (100% soluble at 50° C., water content 10.3%) was added to the dispersion. Upon complete dissolution of the carrageenan, the dispersion was homogenized using an APV Gaulin homogenizer in a single pass at 17,236.9 kPa (2500 psi). After homogenization the dispersion had a viscosity of 5500 cps (Brookfield RVF viscometer, spindle #6, 20 rpm). To this dispersion was added 3 liters of 75% isopropanol heated to 50° C., precipitating a gelatinous mass. This mass was poured through a cheesecloth to remove the majority of the water and isopropanol. Pressing the cheesecloth containing the mass reduced the amount of isopropanol and water further. The solid was then placed in a 50° C. oven for a period of about 16 hours to be dried. The dry solid was milled and passed through a screen having openings 0.2 mm in diameter, producing a white powder having a ratio of MCC:carrageenan of 70:30. This powder had the same peptizability as the product of Example 1.

EXAMPLE 5

In a one liter stainless steel beaker was placed 461.34 grams of water. A dry mixture of 48.0 grams of non-fat dry milk solids, 26.4 grams of sweet dairy whey solids, 42.0 grams of cheddar cheese powder, 0.6 gram of MCC/carrageenan powder (70:30, prepared in Example 1), 14.4 grams of starch, 6.3 grams of salt, 0.6 gram of onion powder, 0.12 gram of black pepper, and 0.12 gram of paprika was prepared and added to the water at room temperature. This mixture was stirred for 5 minutes with a Lightnin' mixer fitted with a propeller blade operated at 1000 rpm. The beaker was then placed in a hot water bath with continued stirring for a total of 7 minutes. After 2 minutes the temperature had reached 76.7° C. (170° F.) at which temperature the mixture began to thicken. Mixing was continued for an additional 5 minutes during which the temperature reached a maximum of 87.8° C. (190° F.). The hot mixture was poured into a jar, and its viscosity was measured as being 14,000 cps (Brookfield, spindle #4, 10 rpm). After cooling for 1.5 hours, the viscosity was 14,600 cps (spindle #5, 10 rpm). Twenty-four hours later the viscosity was 29,500 cps (spindle #6, 10 rpm). This is Example 5A in Table 2. Two cheese sauce formulations were prepared for comparison. In Example 5B the water and non-fat dry milk solids were replaced with skim milk, and in Example 5C the stabilizer is MicroQuick® WC-595, a commercial MCC-based stabilizer. These cheese sauce formulations are detailed in Table 2. Dispersion of MCC/carrageenan in eithermilk or water required 10–15 minutes whereas the MicroQuick® WC-595 required 15–20 minutes for full dispersion.

TABLE 2

| Example | 5A | 5B | 5C |
|---|---|---|---|
| | Weight (grams) | | |
| Water | 461.34 | | 461.34 |
| Non-fat dry milk solids | 48.0 | | 48.0 |
| Skim milk | | 509.34 | |
| Sweet dairy whey[a] | 26.4 | 24.0 | |
| Cheese powder[b] | 42.0 | 42.0 | 42.0 |
| Stabilizer | 0.6[d] | 3.0[d] | 27.0[e] |
| Starch[c] | 14.4 | 14.4 | 14.4 |
| Salt | 6.3 | 6.3 | 6.3 |
| Onion powder | 0.6 | 0.6 | 0.6 |
| Black pepper | 0.12 | 0.12 | 0.12 |
| Paprika | 0.12 | 0.12 | 0.12 |
| | Viscosity (cps) | | |
| Initial | 14,000 | 15,900 | 10,100 |
| After 1.5 hours | 14,600 | 33,800 | 30,400 |
| After 24 hours | 29,500 | 59,500 | 35,000 |

[a]Sweet dairy whey, Land O' Lakes.
[b]Cheese-Treme ® 1326 cheddar cheese powder, Beatrice Foods
[c]Firmtex ® National Starch and Chemical Corporation
[d]MCC/carrageenan (70:30) of Example 1
[e]MicroQuick ® WC-595, FMC Corporation

EXAMPLE 6

A dry blend of 18 grams of starch (IF 131, National Starch and Chemical Corp.), 15 grams of sweet dairy whey solids (Land O' Lakes), 6 grams of MCC/carrageenan (70:30, prepared in Example 1), 6 grams of beef flavor (Beef Consomme, Knorr), and 0.18 gram of white pepper was prepared and dispersed in 533.64 grams of water in a 1 liter stainless steel beaker, using a Lightnin' mixer operated at moderate speed for 10 minutes. This dispersion was heated in a water bath to 82.2° C. (180° F.) after which 18 grams of beef base (NZ, L. J. Minor) and 3 grams of soybean oil were added to the beaker. Heating was continued for 10 minutes until the temperature of the gravy reached 93.3° C. (200° F.). The beaker was removed from the water bath and cooled to room temperature before being placed in a freezer for 3 days storage after which it was defrosted in a refrigerator for 5 days. The reduced fat gravy was then reheated in a microwave oven for 1.5 minutes. The MCC/carrageenan was slightly flocculated, but there was little, or no, syneresis or separation. This is Example 6A in Table 3. A comparative gravy was made in the same manner using MicroQuick® WC-595 in place of the MCC/carrageenan and the sweet dairy whey. This comparative gravy exhibited significant syneresis and separated upon being reheated in the microwave oven. This is Example 6B in Table 3.

TABLE 3

| Example Ingredients | 6A | 6B |
|---|---|---|
| | Weight (grams) | |
| Water | 533.64 | 533.64 |
| Beef base[a] | 18.00 | 18.00 |
| Starch[b] | 18.00 | 18.00 |
| Sweet dairy whey[c] | 15.00 | |
| Stabilizer | 6.00[d] | 21.00[e] |
| Beef Flavor[d] | 6.00 | 6.00 |
| Soybean oil | 3.00 | 3.00 |
| White pepper | 0.18 | 0.18 |

[a]NZ, L. J. Minor
[b]IF 131, National Starch and Chemical Corp
[c]Land O' Lakes
[d]MCC/carrageenan (70:30), Example 1
[e]MicroQuick ® WC-595, FMC Corporation

EXAMPLE 7

A dry blend comprised of 600 grams of sugar, 310 grams of non-fat dry milk solids, 322.5 grams of corn syrup solids, 50 grams of maltodextrin (M-150), 25 grams of MCC/Carrageenan (70:30, prepared in Example 1), 25 grams of vanilla powder, 7 grams of carboxymethylcellulose (Aqualon® 7HF, Hercules, Incorporated), and 0.5 gram of carrageenan (Viscarin® IC 3820, FMC Corporation) was thoroughly mixed. In a large container was placed 3660 grams of whole milk to which was added the entire dry blend with stirring by a Lightnin' mixer fitted with a propeller blade. Mixing continued until the formulation was fully hydrated. The mixture was then heated to 79.4° C. (175° F.) for 30 seconds to pasteurize it. Following pasteurization, the mixture was homogenized using an APV Gaulin homogenizer operated in two stages at 13,789.6 kPa (2000 psi) and 3,447.4 kPa (500 psi), respectively. The mixture was cooled to 4.4° C. (40° F.) in a refrigerator where it was allowed to age for 24 hours after which the viscosity was measured as being 640 cps (Brookfield LVF, spindle #2, 30 rpm). This mixture was frozen in a Taylor freezer, and the ice cream was then hardened for 48 hours after which it was subjected to free/thaw cycles four times/day for 3, 5, and 6 days. At these intervals the ice cream was evaluated for texture. After 6 days this ice cream had very full body and a creamier texture than a comparative ice cream prepared using Avicel® CL-611. The example above is shown in Table 4 as Example 7A, and the comparative ice cream is Example 7B.

TABLE 4

| Example Ingredients | 7A | 7B |
|---|---|---|
| | Weight (grams) | |
| Whole milk | 3660 | 3663 |
| Sugar | 600 | 600 |
| Non-fat dry milk solids | 310 | 310 |
| Corn syrup solids | 322.5 | 322.5 |
| Stabilizer | 25[a] | 20[b] |
| Maltodextrin | 50 | 50 |
| Carrageenan[c] | 0.5 | 1 |
| CMC[d] | 7 | 8.5 |
| Vanilla powder | 25 | 25 |
| Viscosity (cps) | 640 | 550 |

[a]MCC/carrageenan (70:30), Example 1
[b]Avicel ® CL-611 FMC Corporation)
[c]Viscarin ® IC 3820, FMC Corporation
[d]Aqualon ® 7HF, Hercules, Incorporated

EXAMPLE 8

In large container was placed 945.16 grams of milk (1% fat) which was heated to 60° C. (140° F.) at which it was maintained for one minute. The milk was stirred by a Lightnin' mixer fitted with a propeller blade operated at intermediate speed. The addition and dispersion of 5.84 grams of non-fat dry milk solids, 1.00 gram of MCC/carrageenan (70:30, prepared in Example 1), and 3.00 grams of gelatin (250 B) required approximately 5 minutes. This dispersion was homogenized at 17,236.9 kPa (2500 psi) in a single stage. The homogenized dispersion was allowed to cool to 43.3° C. (110° F.). A portion of the dispersion (90 grams) was placed in a second container, and 36.80 grams of live bacteria cultured yogurt (Stonyfield Farms®) was added and thoroughly mixed to inoculate the milk dispersion. The remaining homogenized milk dispersion was added with vigorous mixing during a five minute period. This inoculated milk dispersion was transferred to a glass jar which was then capped and placed in a 43.3° C. (110° F.) water bath for a 4 hour incubation period. At the conclusion of the incubation period the yogurt was placed in a refrigerator for 24 hours before being evaluated. The evaluation started with cutting the yogurt with a plastic spoon which produced a clean cut without any fluid filling the cut. After being stirred with the spoon, the yogurt was smooth with a viscosity of 1100 cps. A 100 mL graduate was filled with yogurt and observed to determine whether there was any separation, referred to as "whey-off". There was none initially and after 13 days of refrigeration. This is Example 8A in Table 5. Example 8B is another formulation of this invention in which MCC/carrageenan is combined with starch to provide a stirred yogurt which did not have any whey-off and was smooth after being stirred; however, this sample did not have as clean a taste as Example 8A. Comparative Example 8C did not provide as clean a cut initially, filling partially with fluid, but no whey-off was observed. Comparative Example 8D provided a clean cut with the spoon, smooth mouthfeel, but had a stringy texture. Table 5 details these formulations.

TABLE 5

| Example | 8A | 8B | 8C | 8D |
|---|---|---|---|---|
| | Weight (grams) | | | |
| Milk (1% fat) | 945.16 | 947.35 | 946.26 | 950.0 |
| Non-fat dry milk solids | 5.84 | 5.65 | 5.74 | |
| Stabilizer[a] | 1.00 | 1.00 | | |
| Gelatin[b] | 3.00 | | | 5.0 |
| Starch[c] | | 1.00 | 3.00 | |
| Cultured yogurt[d] | 36.80 | 36.20 | 37.90 | 38.3 |
| Physical properties | | | | |
| pH[e] | 4.18 | 4.48 | 4.18 | 4.40 |
| Viscosity (cps)[e] | 1100 | 1750 | 3100 | 1500 |

[a]MCC/carrageenan (70:30), Example 1
[b]Gelatin 250 B
[c]Thin-N-Thik ®, National Starch and Chemical Corporation
[d]Live culture yogurt, Stonyfield Farm ®
[e]After 4 hours incubation and 24 hours refrigeration

EXAMPLE 9

In a kettle was placed approximately 150 grams of water. To this water was added 20 grams of starch (Purity® 69, National Starch and Chemical Corporation) with agitation. This mixture was heated to 85–87.8° C. (185–190° F.) at which temperature it was held for 10 minutes before being allowed to cool. In the remaining 223.97 grams of water 12.5 grams of MCC/carrageenan (70:30, prepared in Example 1), 1.50 grams of mustard flour, 3.75 grams powdered egg yolks, and 10 grams of sugar were dispersed using a Silverson mixer for 5 minutes. This dispersion was transferred to the bowl of a Hobart mixer, and a dry blend of 36.25 grams of corn syrup solids (28 DE), 1 gram of titanium dioxide, 0.25 gram of sodium benzoate, 0.25 gram of potassium sorbate, 0.025 gram of calcium disodium EDTA, 0.10 gram of paprika, 0.05 gram of onion powder, and 0.05 gram of garlic powder was added to the dispersion. This mixture was stirred for 5 minutes before a blend of 11.50 grams of hydrogenated soybean oil, 0.50 gram of egg flavor (729015.06T, Firmenich), 0.05 gram of lemon flavor (596.149SW, Firmenich), and 0.005 gram of beta carotene was added. After two additional minutes of mixing, the cooled starch/water blend was added to the dispersion in the Hobart bowl. Mixing was continued for two more minutes before 13.75 grams of salt, 7.50 grams of vinegar (120 grain), and 2.75 grams of lactic acid (88%) were added. After a final 5 minute period of mixing, the non-fat mayonnaise was milled using a Fryma colloid mill at a setting of 0.3 mm. Following dearation this mayonnaise was ready to be put in jars. The initial viscosity of this formulation was 18,200 cps (Brookfield RVT, spindle #6, 10 rpm) and set-up viscosity was 22,900 cps. It was described as being a weak gel having a very smooth consistency, pleasing shine, and gloss. A comparative mayonnaise was prepared using Avicel® CL-611 and xanthan gum as the stabilizer. This comparative formulation (Example 9B in Table 6) provided essentially equal performance to the MCC/carrageenan stabilized mayonnaise (Example 9A in Table 6).

TABLE 6

| Example<br>Ingredients | 9A | 9B |
|---|---|---|
| | Weight (grams) | |
| Water | 373.97 | 375.22 |
| Corn syrup solids (28 DE) | 36.25 | 36.25 |
| Starch[a] | 20.00 | 20.00 |
| Salt | 13.75 | 13.75 |
| Stabilizer | 12.50[b] | 12.50[c] |
| Xanthan gum | | 3.00 |
| Soybean oil[d] | 11.50 | 11.50 |
| Sugar | 10.00 | 10.00 |
| Vinegar (120 grain) | 7.50 | 7.50 |
| Powdered egg yolks | 3.75 | 3.75 |
| Lactic acid (88%) | 2.75 | 2.75 |
| Mustard flour | 1.50 | 1.50 |
| Titanium dioxide | 1.00 | 1.00 |
| Egg flavor[e] | 0.50 | 0.50 |
| Sodium benzoate | 0.25 | 0.25 |
| Potassium sorbate | 0.25 | 0.25 |
| Paprika | 0.10 | 0.10 |
| Lemon flavor[f] | 0.05 | 0.05 |
| Onion powder | 0.05 | 0.05 |
| Garlic powder | 0.05 | 0.05 |
| EDTA, calcium disodium | 0.025 | 0.025 |
| Beta carotene | 0.005 | 0.005 |

[a]Purity ® 69, National Starch and Chemical Corporation
[b]MCC/carrageenan (70:30), Example 1
[c]Avicel ® CL-611, FMC Corporation
[d]Hydrogenated soybean oil
[e]Egg flavor 729015.06T, Firmenich, Inc.
[f]Lemon flavor 596.149SW, Firmenich, Inc.

EXAMPLE 10

In a 250 mL beaker were placed 98 grams of commercial soy sauce (Kikkoman, ~24 weight % salt) and 2 grams of MCC/carrageenan stabilizer (70:30, prepared in Example 1). This mixture was stirred with a Lightnin' mixer fitted with a propeller blade operated at 1700 rpm. Simultaneously, the mixture was heated on a hot plate to 82.2° C. (180° F.), and the dispersion was checked microscopically, but was found not to be fully dispersed. Heating was continued until the temperature reached 93.3° C. (200° F.) at which point the soy sauce thickened to the consistency of a pudding. Microscopic examination indicated that, although the stabilizer was fully functional as a thickening agent, it appeared to be partially flocculated. A reduced amount of stabilizer will provide the desired thickening of the soy sauce, an effect that heretofore has not been successfully accomplished.

EXAMPLE 11

A dry blend comprising 60 grams of onion powder, 70 grams of mushroom flavor, 10 grams of Ribotide® flavor enhancer, 200 grams of salt, 3 grams of white pepper, 2 grams of celery seed, and 1 gram of turmeric was prepared. Simultaneously, in a large Waring blender operated at high speed were placed 3675 grams of water and 100 grams of MCC/carrageenan stabilizer (70:30, prepared in Example 1) for a 5 minute period. This dispersion was transferred to a large vessel. Then, 400 grams of Purity® W starch and 200 grams of Melojel® corn starch were dry blended. This dry blend was placed in a large Waring blender with 3675 grams of water and 200 grams of wheat flour. The blender was operated at high speed for 5 minutes. At the conclusion of this period, this dispersion was also transferred to the large vessel. The two dispersions were heated to 85° C. (180° F.) with stirring. A mixture of 300 grams of heavy cream (18% fat), 270 grams of Minor's mushroom base-N, 150 grams of sugar, 50 grams of dehydrated sweet cream powder, and 20 grams of titanium dioxide was prepared in 1635 grams of water. Also, added to this mixture were the dry blend of spices initially prepared and 30 grams of diced Garden Frost Garlic. This mixture was added to the heated dispersion in the large vessel. Stirring was continued until all components were completely incorporated after which 7349 grams of water and 1600 grams of sliced, canned mushrooms were added. This was heated with stirring until the temperature reached 85° C. (185° F.) at which point the reduced fat cream of mushroom soup was placed in cans, and the cans were sealed The sealed cans were then retorted. Prior to being canned the Bostwick reading for this soup at 76.7° C. (170° F.) was 11.75 at 60 seconds. After retorting this value became 14 at 30 seconds. This is Example 11A in Table 7. Also, included in Table 7 is the formulation of a comparative reduced fat cream of mushroom soup (Example 11B). The Bostwick readings for this comparative soup are 9 and 10.9, respectively. Example 11A has a smoother, more uniform texture than Example 11B as well as much better flavor release.

TABLE 7

| Example<br>Ingredients | 11A | 11B |
|---|---|---|
| | Weight (grams) | |
| Water | 16,334 | 15,834 |
| Sliced mushrooms, canned | 1600 | 1600 |
| Waxy maize starch[a] | 400 | 800 |
| Corn starch[b] | 200 | 400 |
| MCC/cgn stabilizer[c] | 100 | |
| Heavy cream (18% fat) | 300 | 300 |
| Minor's mushroom base-N[d] | 270 | 270 |
| Whole wheat flour | 200 | 200 |
| Salt | 200 | 200 |
| Sugar | 150 | 150 |
| Mushroom flavor[e] | 70 | 70 |
| Onion powder | 60 | 60 |
| Dehydrated sweet cream powder[f] | 50 | 50 |
| Garden Frost Garlic, diced[g] | 30 | 30 |
| Titanium Dioxide | 20 | 20 |
| Ribotide ®[h] | 10 | 10 |
| White pepper | 3 | 3 |

TABLE 7-continued

| Example Ingredients | 11A | 11B |
|---|---|---|
| | Weight (grams) | |
| Celery seed | 2 | 2 |
| Turmeric | 1 | 1 |

[a] Purity ® W, National Starch and Chemical Corporation
[b] Melogel ®, National Starch and Chemical Corporation
[c] MCC/carrageenan (70:30), Example 1
[d] Fidco Industrial Division, Food Ingredient Specialties, Inc.
[e] Gb Select Mushroom Type flavor, Gist-brocades
[f] Mid-America Farms
[g] Gilroy Foods, Inc.
[h] Takeda

EXAMPLE 12

A model salad formulation, i.e., it does not include flavorings and herbs, but does include the ingredients which affect stability of the dressing, was prepared by dispersing 15 grams of MCC/carrageenan (70:30, prepared in Example 1) in 542.40 grams of deionized water using a Lightnin' mixer fitted with a propeller blade. Dispersion required five minutes. To this dispersion were added 30 grams of vinegar (120 grain), 12 grams of salt, and 0.60 gram of potassium sorbate. This model salad dressing was mixed for 5 additional minutes. The initial viscosity was 5800 cps (Brookfield, spindle #5, 20 rpm) and after being stored for one week the viscosity was 5000 cps, and the model dressing was stable.

EXAMPLE 13

A dry blend of 30 grams of sugar, 26.86 grams of non-fat milk solids, 4 grams of high viscosity guar (FG 60–70), and 3 grams of microcrystalline cellulose/iota carrageenan (70:30, Example 1) was prepared and thoroughly mixed. This dry blend was added to 933.14 grams of 2% milk which was stirred with a propeller-type stirrer. After being fully dispersed, the liquid mixture was pasteurized at 93° C. (200° F.) and then homogenized in a single stage at 17,236.9 kPa (2500 psi). The mixture was then cooled to 44–45° C. (112–114° F.) and inoculated with 3 grams of starter culture (YC-470, Chr. Hansen, Inc.). The yogurt was incubated at 45° C. (114° F.) for period of time until the pH was between 4.4 and 4.6 after which it was refrigerated. The pH continued dropping until it reached 3.8. The yogurt was strongly gelled, and there was no evidence of whey-off. The viscosity before stirring was 18,000 cps.

We claim:

1. A dried composition comprising coprocessed colloidal microcrystalline cellulose and iota carrageenan, said carrageenan having a dissolution temperature in water no higher than 80° C., wherein the weight ratio of microcrystalline cellulose to iota carrageenan is in the range from 80:20 to 50:50, respectively.

2. A composition of claim 1 wherein the weight ratio of colloidal microcrystalline cellulose to iota carrageenan is 70:30.

3. A composition of claim 1 wherein the weight ratio of colloidal microcrystalline cellulose to iota carrageenan is 50:50.

4. A composition of claim 1 wherein the iota carrageenan is soluble in water at 50° C.

5. A dried composition of claim 1 which can be peptized in an aqueous medium with minimal agitation.

6. A composition of claim 5 which can be peptized in a neutral or acidic aqueous medium.

7. A composition of claim 5 which can be peptized in an aqueous medium containing up to 24 weight % salt.

8. A process for preparing a composition of claim 1 comprising the following steps:

(a) subjecting hydrolyzed cellulose to attrition to make colloidal microcrystalline cellulose;

(b) dispersing said colloidal microcrystalline cellulose in water heated to a temperature above the solubility temperature of the dry iota carrageenan to be coprocessed with said colloidal microcrystalline cellulose;

(c) adding said dry iota carrageenan to said heated dispersion of colloidal microcrystalline cellulose and mixing the components, creating a slurry;

(d) homogenizing said slurry; and (e) drying said slurry to produce a coprocessed powder.

9. A process of claim 8 in which the method of drying said slurry is spray drying.

10. A process of claim 8 in which the method of drying said slurry comprises the following additional steps:

(a) adding aqueous isopropanol to the slurry to flocculate the solids therein;

(b) separating said solids from the liquid;

(c) drying said solids;

(d) milling said solids to produce a powder.

11. A process of claim 8 wherein the temperature of said heated colloidal microcrystalline slurry is about 57° C. and said iota carrageenan has an aqueous solubility temperature of about 50° C.

12. A food comprising a composition of claim 1 wherein said composition of claim 1 comprises about 0.05 weight % to about 3 weight % of said food.

13. A food of claim 12 wherein said composition of claim 1 comprises about 0.05 weight % to about 2 weight % of said food.

14. A food of claim 12 selected from the group consisting of dry mixes, frozen desserts, mayonnaise, salad dressing, soy sauce, and yogurt.

* * * * *